United States Patent [19]

Duley

[11] Patent Number: 4,734,807

[45] Date of Patent: Mar. 29, 1988

[54] CASSETTE TAPE CLEANER

[76] Inventor: David Duley, Rte. #2, Box 224, Dexter, Mo. 63841

[21] Appl. No.: 65,095

[22] Filed: Jun. 22, 1987

Related U.S. Application Data

[63] Continuation of Ser. No. 782,634, Oct. 2, 1985.

[51] Int. Cl.$^4$ ............................................... G11B 5/41
[52] U.S. Cl. ................................................... 360/128
[58] Field of Search ........................... 360/128, 137, 94

[56] References Cited

U.S. PATENT DOCUMENTS 4,004,314  1/1977  Post et al. ........................ 360/128 X

FOREIGN PATENT DOCUMENTS 2072920A  10/1981  United Kingdom ................ 360/128
2073470A  10/1981  United Kingdom ................ 360/128

*Primary Examiner*—John H. Wolff
*Attorney, Agent, or Firm*—John K. Donaghy

[57] ABSTRACT

This invention comptemplates providing a tape cassette cleaner which is light in weight, simple and easy to manufacture and comprises a housing having a forward section in which there is a rotatable spool to be engaged by the drive mechanism of a tape recorder. The housing has a rearward section having a spool therein which is driven by the first spool by a drive belt. The rear section has a spindle extending from the pulley wheel and is adapted to engage a spool of a tape cassette. Adjacent the spindle is a projection which is adapted to engage the other spool of a tape cassette. Wiping pads are provided on supports which wiping pads engage the tape or film of a tape cassette. When the forward section is inserted into a tape recorder, the pulley wheels are driven by the interconnecting drive belt and the tape cassette tape is caused to move past the wiping surfaces to clean dirt and oxide therefrom. One of the wiping surfaces may be saturated with a cleaning solution manually.

5 Claims, 10 Drawing Figures

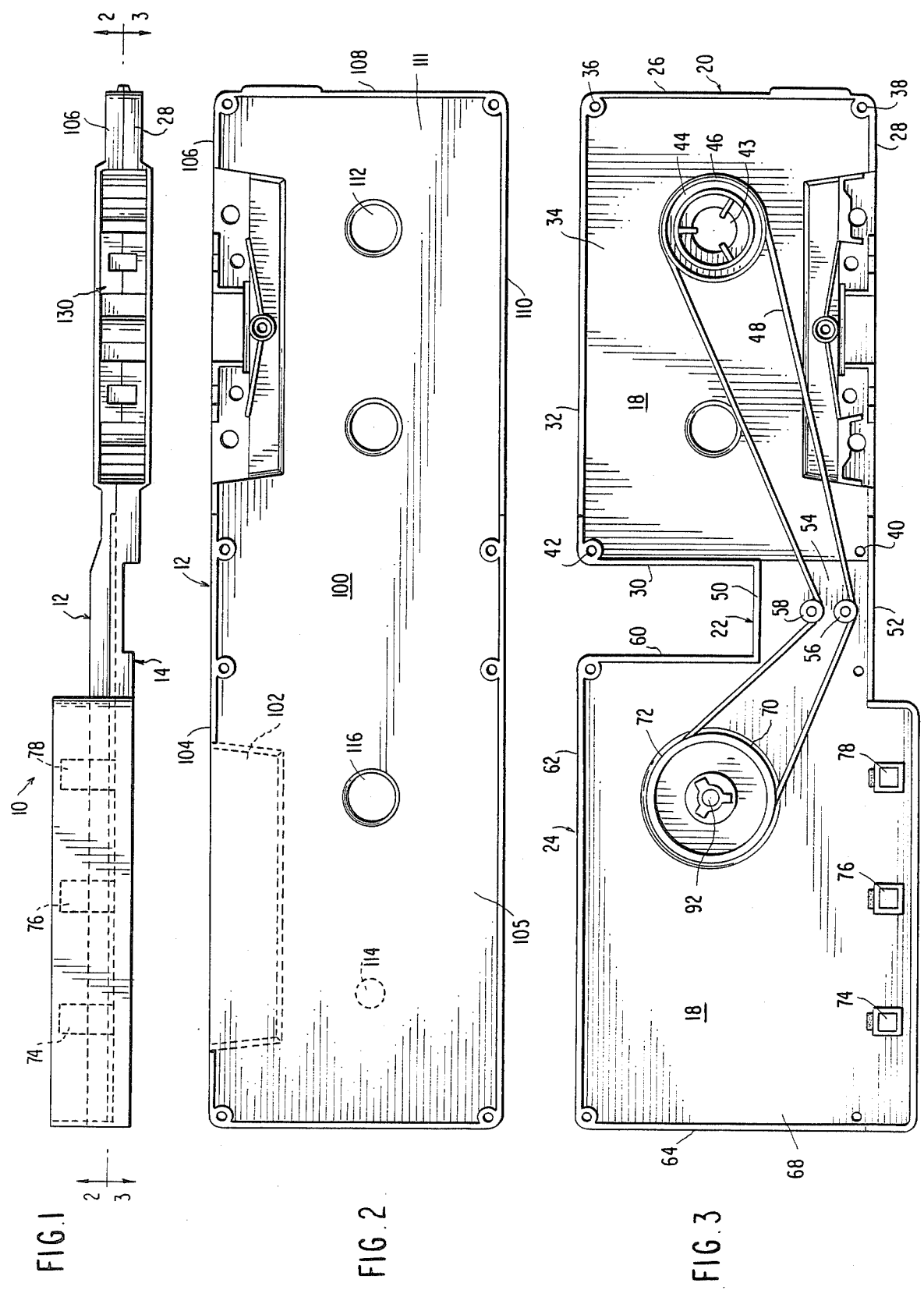

CASSETTE TAPE CLEANER

This is a continuation of application Ser. No. 782,634, filed Oct. 2, 1985.

BACKGROUND OF THE INVENTION

1. Field of the Invention:

This invention pertains to a device for cleaning dirt or oxide from the surface of a tape used in any type of cassette for recording purposes.

2. Background of the Prior Art:

The prior art discloses devices for cleaning cassette tapes. Such devices are complicated, bulky and expensive to manufacture For example, Stutz (U.S. Pat. No. 4,324,014) discloses a cassette tape cleaner which utilizes a carbiode steel blade, a guide scraper and a cleaning pad to which a dispenser delivers cleaning solution. Vowles (U.S. Pat. No. 4,211,580) is also a cleaner for cassette tapes. The cleaning is performed during normal use of the cassette tape and a cleaning solution delivery system is utilized. Kuntz (U.S. Pat. No. 3,701,178) discloses a devcie which cleans both sides of a tape and utilizes blades to scrape the tape and a means to clean the blades as the tape is being scraped. Freedman (U.S. Pat. No. 3,640,293) describes a method and apparatus for cleaning films and utilizes a series of pulleys to drive the film between a pair of opposed brushes.

SUMMARY OF THE INVENTION

This invention is directed to a cassette tape cleaner which is structurally uncomplicated, light in weight and inexpensive to produce.

It is another object of this invention to provide a cassette tape cleaner which eliminates cleaning solution delivery systems, cooling fans and complicated drive mechanism in favor of an uncomplicated lightweight device which utilizes replaceable cleaning pads for cleaning the recording surface of a tape or film.

Yet another object of this invention is to provide a cassette tape cleaner which utilizes a simple motor and tape drive system which includes a lamp to indicate when the device is on or off.

And still another object of this invention is to provde a tape cleaner which is used in conjunction with an automobile cassette player to clean a cassette tape.

These and other objects of the invention will become apparent to those to which the invention pertains from a reading of the following specification when taken in light of the drawings annexed hereto.

BRIEF DESCRIPTION OF THE DRAWINGS

FIG. 1 is a side view of a cassette tape cleaner which is used in conjunction with an automobile tape player.

FIG. 2 is a plan view of the inside of the top part of the invention.

FIG. 3 is a plan view of the inside of the bottom part of the invention.

DESCRIPTION OF THE PREFERRED EMBODIEMNT OF THE INVENTION

Figure 4:
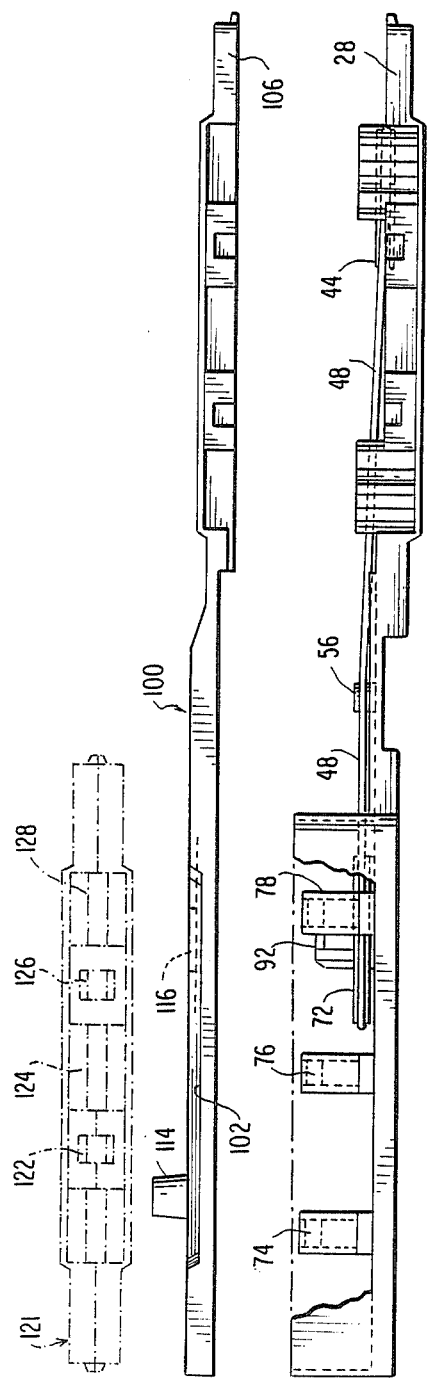
FIG. 4 is an exploded side view in section of the invention with a cassette tape in phantom line shown just prior to engagement with the cleaner.

Referring now in more detail to the drawings, FIG. 1 shows a cassette tape cleaner 10 having a top part 12 and a bottom part 14. In FIG. 2 there is shown the inside 16 of the top part 12 and in FIG. 3 there is shown a plan view of the inside 18 of the bottom part 14.

The inside 18 comprises three sections; section 20, section 22 and section 24. Section 20 is the foward part of the device and is defined by vertical walls 26, 28, 30 and 32 and an inside surface 34. At the four corners of the forward section 20 are recesses 36, 38, 40 and 42 to receive screw-type fasteners, Positioned on the surface 34 on a suitable hub (not shown) is a pulley wheel 44 about which there is trained a loop 46 of a belt drive 48. Section 22 is a central section has a wall 50 joining wall 30 and a wall 52 coterminous with wall 28. On the surface 54 there are guide rollers 56 and 58 for the drive belt 48.

Section 34 is a rearward section and is defined by walls 60, 62, 64 and 66 and a surface 68. On a suitable hub (not shown) is a pulley wheel 70 about which is trained the opposite loop 72 of the drive belt 48. Adjacent the wall 66 on the surface 68 are a plurality of posts 74, 76 and 78 which support removable sleeves 80, 82 and 84, each of which has a wiping surface 86, 88 and 90. It will be appreciated that the sleeves 80, 82 and 84 may comprise the wiping surfaces and may be rotated to expose clean surfaces for the tape to be cleaned. The sleeves with the wiping surfces are replaceable when necessary to effect proper cleaning of a cassette tape or film.

Extending from the pulley 70 and rotatable therewith is a spindle 92 which projects a distance above the pulley 70. The function of the spindle 92 will be described below.

The top part 12, FIGS. 2 and 4, has a generally flat surface 100 having a well 102 near edge 104 on the rearward section 105 and depending walls 106, 108 and 110 on the opposite or forward end 111. It will be appreciated that wall 26 of the bottom part 14 is complimentary with the wall 108 of the part 12. Also, wall 28 compliments wall 106 and wall 32 compliments wall 110. When the top and bottom parts are combined, the forward section is substantially identical to a conventional tape cassette.

On the surface 100 is a hub 112 which cooperates with the hub 43 on which pulley 44 is positioned. At the opposite end 105, near the well 102 is a vertical projection 114 and an aperture 116 through which the spindle 92 extends, FIGS. 4 and 5. The top parts 12, FIG. 5, is secured to the bottom part 14 by suitable screw fasteners 120.

Figure 5:
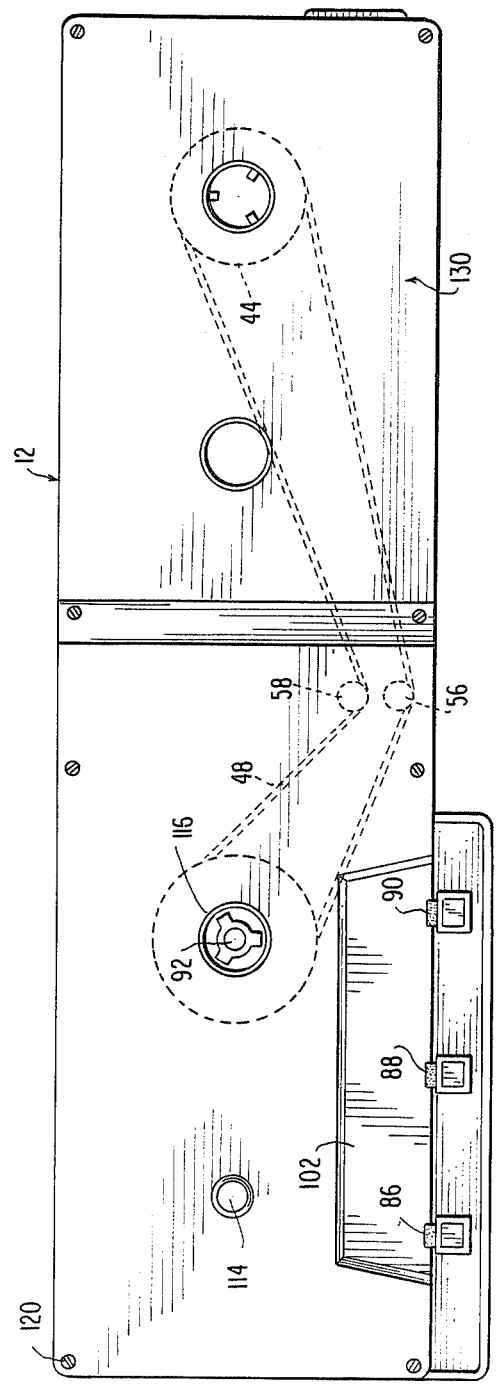
FIG. 5 is a plan view of the device of FIG. 4.
Figure 6:
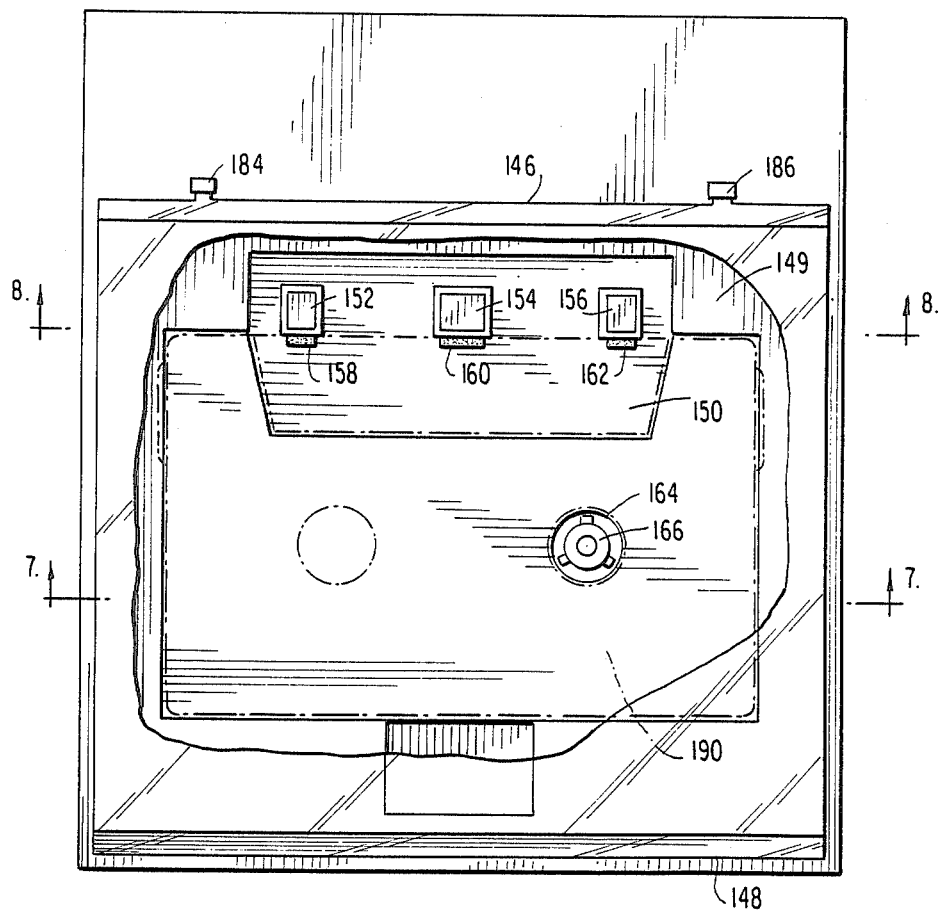
FIG. 6 is a plan view of the invention for use in the home.
Figure 7:
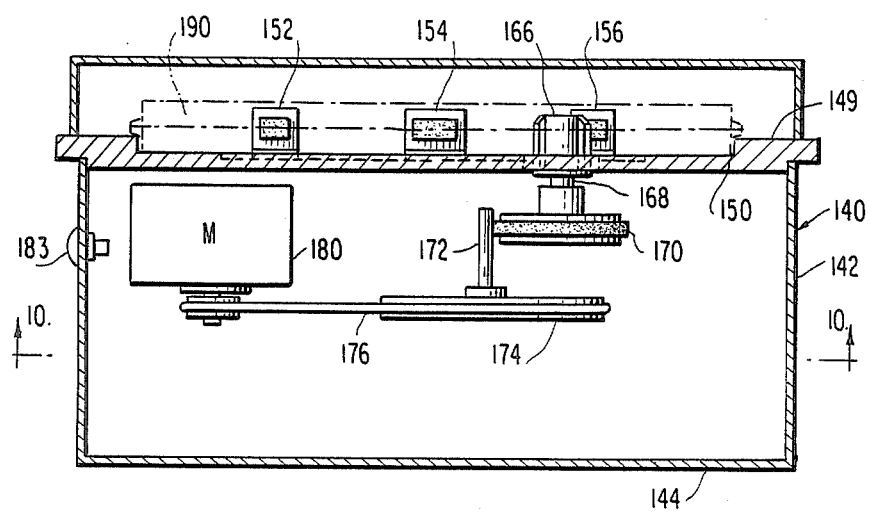
FIG. 7 is a side view in section of the device taken along the line 7—7 of FIG. 6.
Figure 8:
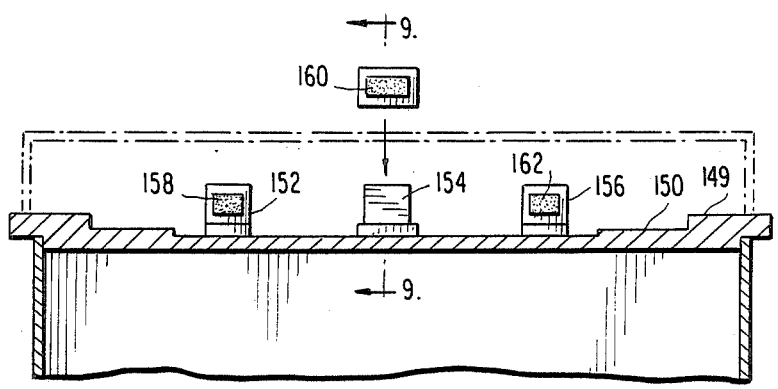
FIG. 8 is a view taken along the line 8—8 of FIG. 6 and shows the removable cleaning pads.
Figure 9:
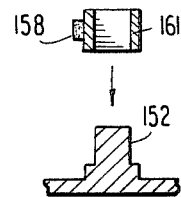
FIG. 9 is an exploded view of one of the removable cleaning pads and is taken along the line 9—9 of FIG. 8.
Figure 10:
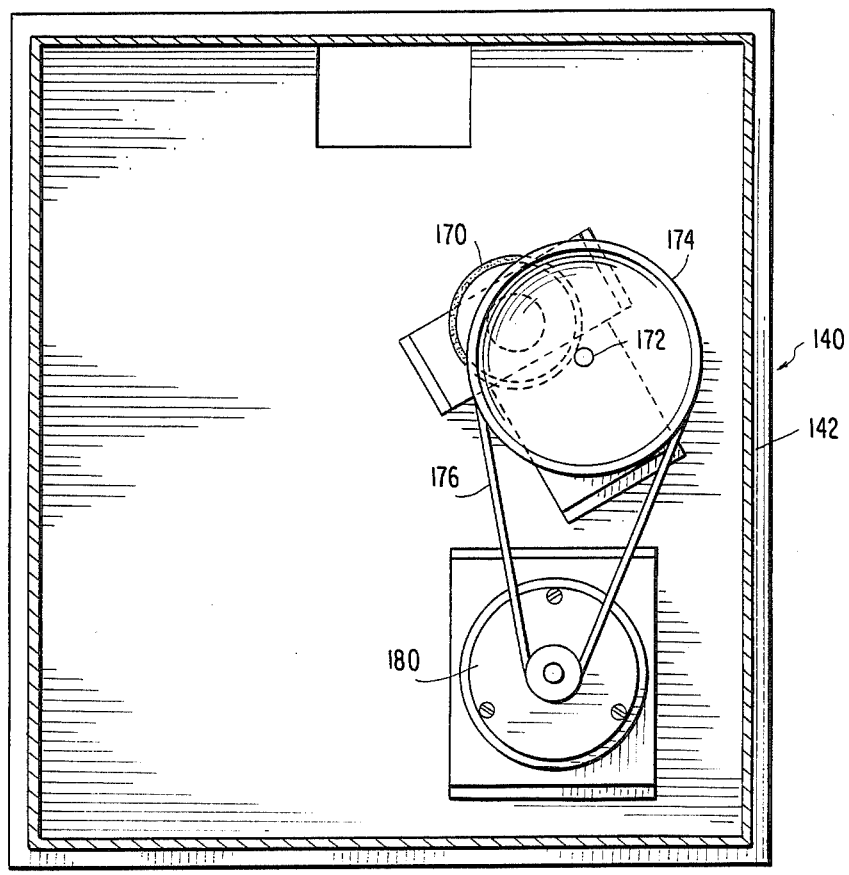
FIG. 10 is a view taken along the line 10—10 of FIG. 7 and shows the motor and tape drive arrangement.

In operation, FIGS. 4 and 5, a cassette tape 121 having the usual windows 122 through which a tape or film 128 is exposed is positioned such that one of its spools is placed on projection 114 and the other spool is placed on the spindle 92 such that the wiping surfaces 86, 88 and 90 engage the cassette tape or film 128. The forward end 130 which is, as mentioned previously, identical to a cassette tape, inserted into an automobile tape player (not shown) which functions in the usual manner to rotate the pulley wheel 44 which in turn turns the drive belt 48 to rotate the pulley 70 and spindle 92. As the spindle 92 is in engagement with one of the spools about which the tape or film 128 is wound, the tape is moved against the wiping surfaces 86, 88 and 90 and is thus cleaned. One or more of the wiping surfaces may be saturated with a cleaning solution to remove dirt or oxide. One or more of the other wiping surfaces will, of course, be dry to remove this solution from the tape or film. The cleaning surface material may be cloth or felt-like material to effect optimum application of solution and absorption of the solution.

When the tape or film has been completely wound and thus completely cleaned, the part inside the cassette player will detect this condition as though a tape on the inside part was completely wound to trigger ejection of the inside part from the player.

The foregoing describes a cassette cleaner for use in conjunction with an automobile tape player.

Another embodiment of the invention shown in FIG. 6 through 10. This device is for use in the home and comprises a housing 140 having side walls 144, bottom wall 142, back wall 146, a front wall 148 and a top wall 149 having a well 150 therein. A plurality of posts 152, 154 and 156 support a plurality of removable sleeves 161 upon which there are wiping surfaces 158, 160 and 162. As in the previous embodiment, the sleeves may comprise the wiping surfaces and may be rotated to expose a new surface to the film. The sleeves 161 are replaceable when worn or dirty. The top surface 149 has an aperture (FIG. 6) 164 for receiving the end 166 of a spindle 168 which has a pulley 170. The pulley 170 meshes or is driven by a spindle 172 of a pulley wheel 174. The drive belt 176 is driven by a pulley of the motor 180. A suitable cover 182 of translucent material is hinged on hinges 184 and 186 and is maintained closed to prevent dust and dirt from entering the unit.

The motor has an electrical connection and plug to permit the unit to be plugged into a conventional electrical outlet and a switch is used to turn on and off the device. An indicator lamp 183 may be used to indicate when the unit is on or when the tape is completely wound a thus cleaned.

In operation, a cassette tape 190 is placed in the well 150 such that the tape or film engages the cleaning pads or surfaces 158, 160 and 162. One of the leading surface may be saturated with a cleaning solution and one or more of the other surfaces is maintained dry to wipe the excess solution from the recording surface when the machine is in operation. When the tape has been completely cleaned it will have been completely wound on the takeup spool of the cassette. When this occurs, the pulley belt 176 slips on the pulleys so that little or no tension is placed on the cassette tape or film. The indicator lamp 183 may be used to indicate that the tape has been completely wound and thus cleaned. This may be accomplished by any suitable arrangement of microswitches or trip switches.

While the invention has been described with regard to a particular embodiment thereof, it will be appreciated to those skilled in the art that numerous changes or modifications may be made therein without departing from the spirit and scope of the invention.

What I claim is:

1. A tape cleaning device, particularly for cleaning tape contained in cartridges, cassettes or analogous receptacles, comprising:

a housing shaped to receive and hold a receptacle accommodating tape which is to be cleaned;
    means in said housing for advancing the tape in the receptacle past an opening in the receptacle through which a tape playing or recording device normally engages the tape, and past a cleaning station in the housing; and
    tape cleaning means in said housing at said cleaning station in a position to engage and clean the tape through the opening as the tape is advanced past said cleaning station, said tape cleaning means comprising more than two spaced apart, upstanding posts disposed closely adjacent the path of the tape being advanced, each post having a longitudinal axis extending transverse to the direction of movement of the tape and parallel to the plane of the tape at said station, and a sleeve-like tape cleaning pad replaceably mounted on each said post for successive engagement with the tape as the tape moves past the posts for cleaning the tape as the tape advances past the cleaning pads, said cleaning pads on successive posts performing discrete functions and being normally stationary on said posts but being selectively rotatable on the posts to bring successive portions of the pad into engagement with the tape, and said pads being removable from the post for replacement with a fresh pad, whereby a fresh section of cleaning pad may be selected for engagement with the tape.

2. A tape cleaning device as claimed in claim 1 wherein:

at least one of said cleaning pads which is positioned to engage the tape first as it advances past the cleaning station is saturated with a cleaning solution or solvent, and at least one of the cleaning pads positioned to engage the tape last as it advances past the cleaning station is relatively dry to wipe excess cleaning solution or solvent off of said tape as the tape moves past the cleaning station.

3. A tape cleaning device as claimed in claim 1, wherein:

said housing has a leading end insertable into a tape recording and playing device having a capstan drive, and a trailing end adapted to receive the receptacle accommodating the tape which is to be cleaned; and
    said means for advancing the tape comprises motion-transmitting means in said housing adapted to be engaged and driven by said capstan drive and operable to advance the tape in the receptacle to bring successive portions thereof past said opening and said cleaning station for cleaning the tape.

4. A tape cleaning device as claimed in claim 3, wherein:

said housing leading end is shaped and sized substantially the same as the receptacle which contains the tape to be cleaned; and
    said motion-transmitting means includes a first pulley in said leanding end adapted to be engaged and driven by said capstan drive, a second pulley in the trailing end shaped and positioned to engage and advance the tape in the receptacle just as would be effected by engagement of said tape with said capstan drive, and a drive belt engaged with said first and second pulleys to advance the tape upon rotation of the capstan drive.

5. A tape cleaning device as claimed in claim 1, wherein:

the means in the housing for advancing the tape comprises a spindle positioned to engage and advance the tape in the receptacle, a motor, and interengaging drive and driven wheels connected between the motor and spindle to rotate the spindle to advance the tape.

* * * * *